(12) United States Patent
Peterson et al.

(10) Patent No.: US 6,178,398 B1
(45) Date of Patent: Jan. 23, 2001

(54) METHOD, DEVICE AND SYSTEM FOR NOISE-TOLERANT LANGUAGE UNDERSTANDING

(75) Inventors: Richard John Peterson, Portland, OR (US); Dale William Russell, Palatine, IL (US); Orhan Karaali, Rolling Meadows, IL (US); Harry Martin Bliss, Evanston, IL (US)

(73) Assignee: Motorola, Inc., Schaumburg, IL (US)

( * ) Notice: Under 35 U.S.C. 154(b), the term of this patent shall be extended for 0 days.

(21) Appl. No.: 08/972,515

(22) Filed: Nov. 18, 1997

(51) Int. Cl.[7] .................................................. G10L 15/06
(52) U.S. Cl. ............................................ 704/232; 704/255
(58) Field of Search .................................... 704/251, 231, 704/232, 233, 258, 257, 200, 255

(56) References Cited

U.S. PATENT DOCUMENTS

| | | |
|---|---|---|
| 4,829,578 * 5/1989 | Roberts | 704/231 |
| 5,212,821 * 5/1993 | Gorin et al. | 706/15 |
| 5,579,436 * 11/1996 | Chou et al. | 704/244 |
| 5,583,968 * 12/1996 | Trompf | 704/232 |
| 5,621,858 * 4/1997 | Stork et al. | 704/232 |

\* cited by examiner

*Primary Examiner*—Richemond Dorvil
(74) *Attorney, Agent, or Firm*—Douglas D. Fekete

(57) ABSTRACT

A method (900), device (200) and system (100) provide, in response to text/linguistic input, one of a set of predetermined meanings which is the most likely intended meaning of that input. A trained meaning discriminator is generated from an annotated training corpus and a meaning discriminator trainer. The trained meaning discriminator generates a meaning vector from an input utterance. The intended meaning encoder analyzes the meaning vector to determine the most likely intended meaning and confidence measures.

49 Claims, 5 Drawing Sheets

METHOD, DEVICE AND SYSTEM FOR NOISE-TOLERANT LANGUAGE UNDERSTANDING

FIELD OF THE INVENTION

The present invention relates to natural language understanding systems, and more particularly to the interpretation of speech recognizer output for selecting one of a limited set of pre-determined meanings.

BACKGROUND OF THE INVENTION

A natural language understanding system assigns meanings to input strings of words representing utterances produced by humans. Where the string is the output of a speech recognizer, and especially of one operating in a noisy environment, it is likely that the string does not constitute a well-formed sentence of the language, as it may contain insertions, deletions or substitutions of incorrect words. It is desirable that a natural language understanding system be able to extract meaning even from imperfect input.

Syntactic parsers have been used in some natural language understanding systems to construct a structured representation of the meaning of an input string along with its syntactic structure. Such parsers require an exhaustive specification of the grammar of acceptable input strings, and are often susceptible to the imperfections in the string that characterize speech recognizer output. However, many domains in which language understanding systems are used are characterized by allowing only a small set of distinct atomic (i.e., not further decomposable) meanings. In such domains, there is no need for a structured representation of syntax or meaning.

Hence, there is a need for a method, device and system for inferring one of a pre-defined set of meanings from an input utterance, without reliance on the ability to generate a syntactic structure for the utterance.

DETAILED DESCRIPTION OF A PREFERRED EMBODIMENT

The present invention provides a method, device and system for selecting one meaning from a pre-defined set of meanings from an input utterance without reliance on the ability to generate a syntactic structure for the utterance. For example, in a vehicle navigation system the driver may request one of a set of help options using unrestricted language.

Figure 1:
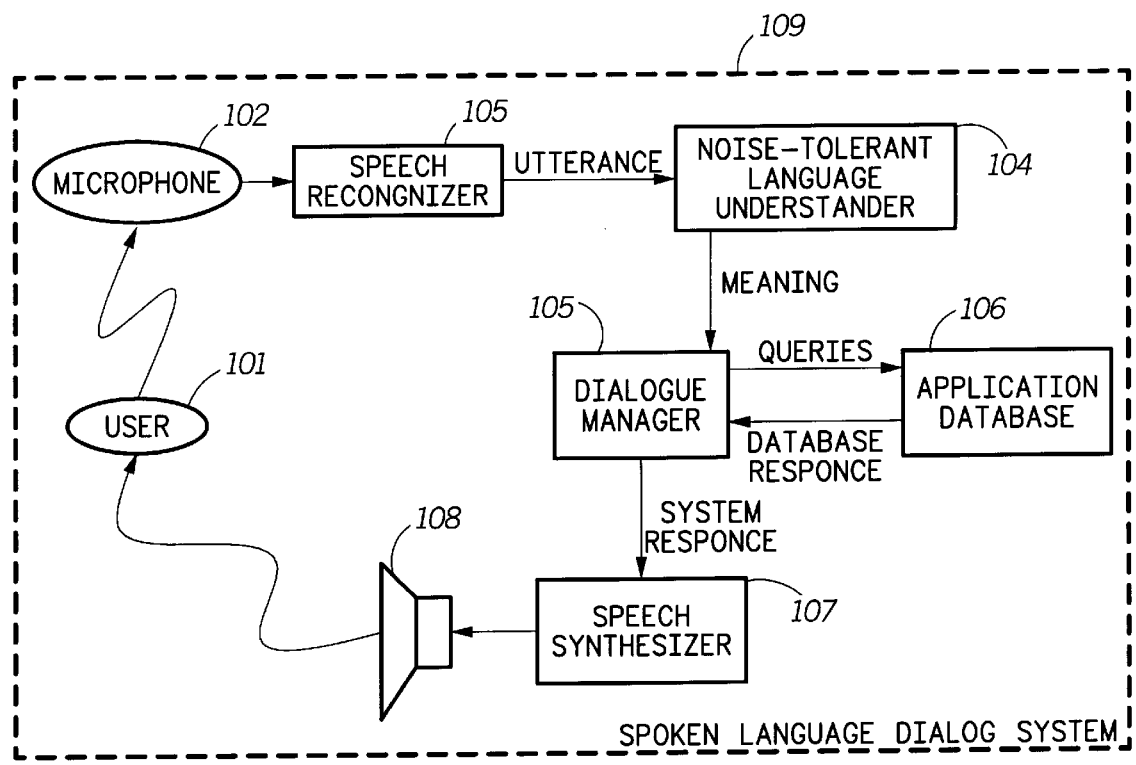
FIG. 1 is a schematic representation of the position of a noise-tolerant language understander in a spoken language dialog system.

FIG. 1, numeral 100, is a schematic representation of the position of a Noise-Tolerant Language Understander (104) in a Spoken language Dialog System (109). A User (101) of the Spoken Language Dialogue System (109) speaks into a Microphone (102). The Microphone is connected to a Speech Recognizer(103) which generates an utterance. The utterance is input to a Noise-Tolerant Language Understander (104), which generates a meaning. The meaning is input to a Dialogue Manager (105), which generates queries. The queries are input to an Application Database (106), which sends database responses back to the Dialogue Manager (105). The Dialogue Manager (105) generates a system response, which is input to a Speech Synthesizer (107). The Speech Synthesizer is connected to a Speaker (108), through which the response is presented to the User (101).

Figure 2:
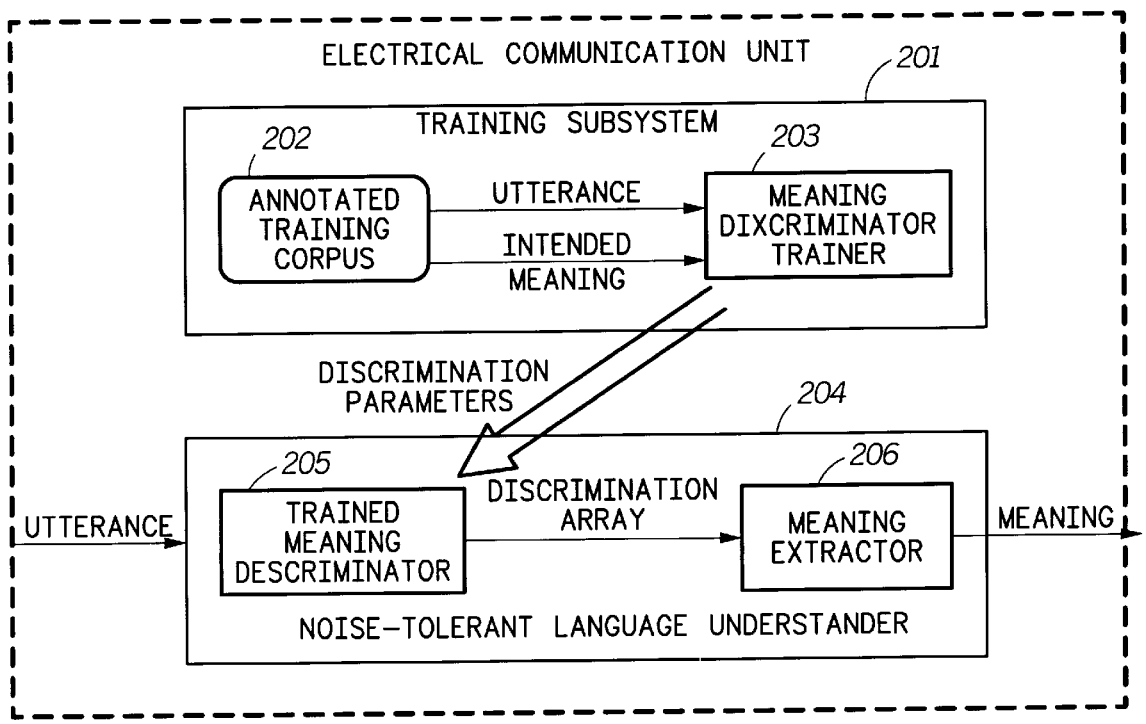
FIG. 2 is a schematic representation of an embodiment of a noise tolerant understanding system in accordance with the present invention.

As shown in FIG. 2, numeral 200, in a preferred embodiment the present invention includes a Training Subsystem (201), which uses information derived from an Annotated Training Corpus (202) to generate a Trained Meaning Discriminator (205). A Noise-Tolerant Language Understander (204) comprises the Trained Meaning Discriminator (205) and a Meaning Extractor (206). The Trained Meaning Discriminator (205) generates a discrimination array of relative likelihoods of meanings, and the Meaning Extractor (206) calculates a most likely meaning of the input utterance. The requirements of the device therefore include (1) a complete predetermined list of the possible utterance meanings based on the application, each of them atomic, i.e., not further decomposable, and thus capable of being represented as a distinct integer; and (2) an Annotated Training Corpus (202), which is defined as a representative sampling of utterances based on the application where each utterance is paired with at least one meaning from the set.

From the Annotated Training Corpus (202), the device generates rules for determining the likelihood of each of the atomic meanings, given any input utterance. The quality of the rules, and thus the accuracy of the device are dependent on the quantity, quality and representativeness of the training data.

The device uses one of two schemes for generating the meaning-determining rules. In one scheme, the device utilizes statistics derived from an Annotated Training Corpus (202) to generate a trained statistical lexicon, where each lexical item encodes a strength with which the lexical item indicates for or against each of the possible atomic meanings. In a second scheme the device utilizes a feed forward neural network to learn the possible atomic meanings by iteratively training on the annotated corpus. The internal representation of the trained neural network, defined by the network's weights, characterizes a mapping of a sentence to the possible atomic meanings. These two schemes are described in turn.

Figure 3:
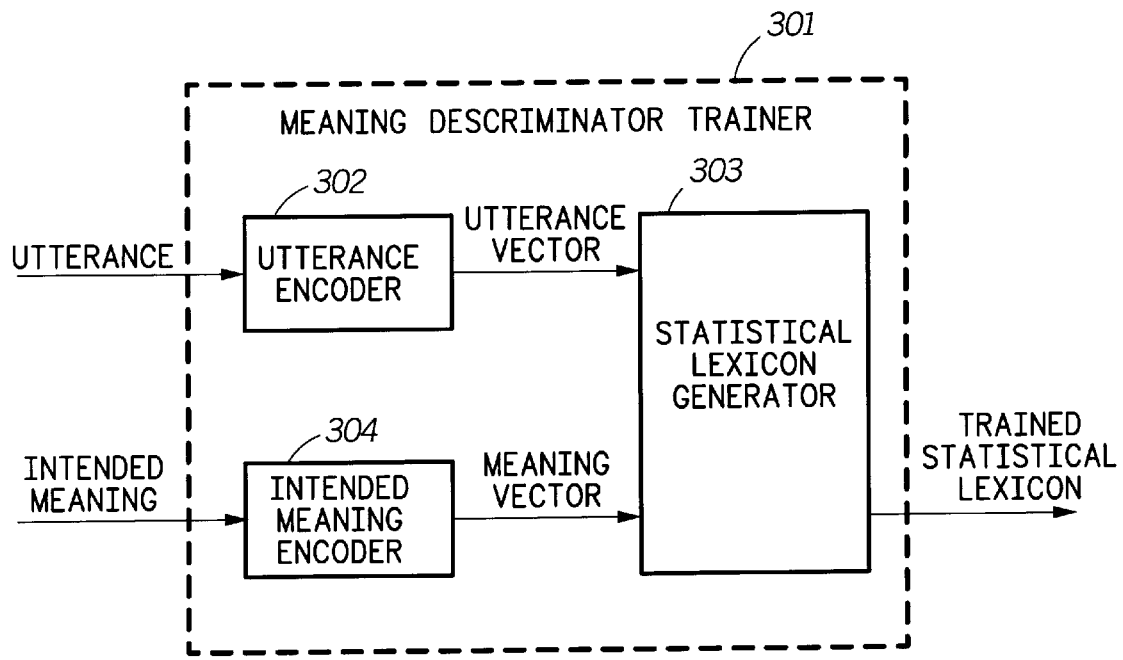
FIG. 3 is a schematic representation of an embodiment of a meaning discriminator trainer in accordance with the present invention.

In FIG. 3, numeral 300, a preferred embodiment of a Meaning Discriminator Trainer (301) which utilizes a statistical scheme is shown.

The statistical scheme is built on the assumption that every word in an utterance of a given domain has the potential to be an indicator for or against each of the possible meanings of the domain, in proportion to the distribution of occurrence of the word with each of the meanings. A semantically empty word (e.g., a function word, such as "the" or "an") is not an indicator for or against any of the possible atomic meanings and would therefore be expected to occur at the level of chance in an utterance, regardless of the meaning of the utterance. If a word occurs at greater than the level of chance in utterances with respect to a particular meaning, the word is a positive indicator for the meaning. Conversely, if the word occurs at less than the level of chance with respect to a particular meaning, the word is a negative indicator for the meaning. To determine the most likely meaning of an utterance, the positive and negative indications of the words in the utterance are weighed via a predetermined formula, e.g., by empirical results, based on knowledge of the domain and any other predetermined criteria. The meaning which receives the strongest overall positive indication is taken to be the most likely. This scheme is described in more detail below.

The first step of the scheme is to determine, for each word in the lexicon, the likelihood of the word appearing in a random utterance of the domain simply on the basis of chance. The likelihood is calculated from the total number of occurrences of the word in the Annotated Training Corpus (202) divided by number of utterances in the Annotated Training Corpus (202). Each utterance of the Annotated Training Corpus (202) is input to an Utterance Encoder (302), which generates an utterance vector. For each utterance, at least one corresponding intended meaning is input to an Intended Meaning Encoder (304), which generates a meaning vector. The utterance vector and the meaning vector are input to the Statistical Lexicon Generator (303).

The second step of the scheme is to determine the likelihood of the word occurring in an utterance which is associated with each of the possible meanings in the domain. The likelihood is calculated for each of the possible meanings, from the number of occurrences of the word in utterances associated with the meaning, divided by the number of utterances associated with the meaning in the Annotated Training Corpus (202).

The difference between the likelihood of a word over the entire Annotated Training Corpus (202) and the likelihood for a particular meaning is a measure of the strength with which the word is an indicator for or against that meaning. If the two likelihoods are the same, the word is neither a positive nor a negative indicator for the meaning. To the degree that the word is more likely to occur in utterances associated with a particular meaning than in utterances of the entire Annotated Training Corpus (202), the word is a positive indicator for that meaning. Similarly, if a word occurs at less than the level of chance in utterances associated with a particular meaning, the word is a negative indicator for that meaning.

To quantify the exact strength with which a word serves as a positive or negative indicator for a particular meaning, the difference between the likelihood of occurrence with the meaning vs. the entire Annotated Training Corpus (202) is expressed in terms of the number of standard deviations.

It is then possible for a Statistical Lexicon Generator (303) to generate a Trained Meaning Discriminator (205), embodied as a lexicon of the words in the Annotated Training Corpus (202), where each word is annotated with the relative strengths (see Table 1 below) of its indications for or against each of the possible meanings. In order to represent the strengths of these indications, each word in the lexicon is assigned some arbitrary number of votes, say 100. Each word's votes are distributed among the set of possible meanings, thus being cast either for or against each meaning. The number of votes cast for or against a particular meaning reflects the divergence of the likelihood of occurrence of the word with that meaning from the likelihood of occurrence in the entire training corpus. A word will cast few or no votes for or against meanings where it occurs at the level of chance, a small number of votes for or against meanings for which it is a weak positive or negative indicator, and a large number of votes where the word is a stronger indicator. The number of votes cast by a word for each meaning directly correlates with the number of standard deviations by which the occurrences of the word with that meaning differs from the occurrences of the word at the level of chance.

Figure 5:
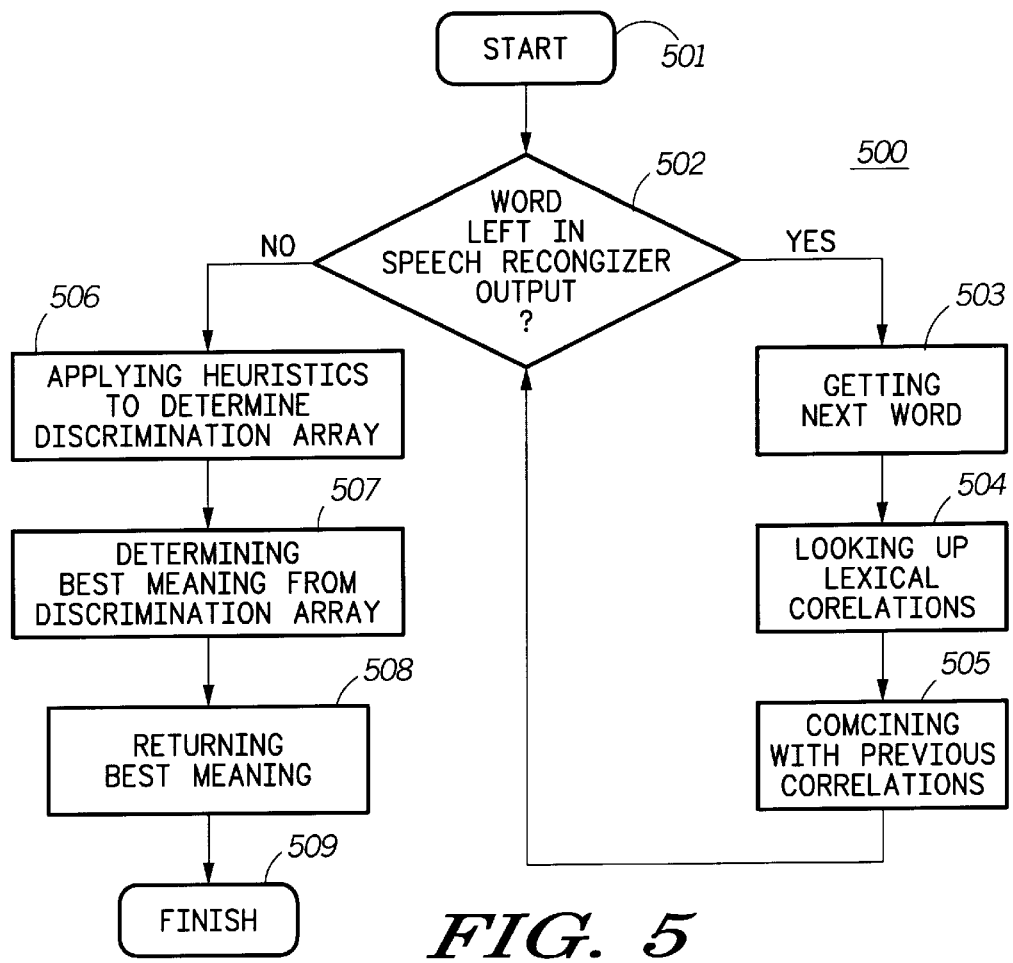
FIG. 5 is a flow chart representation of one embodiment of steps of a statistical based noise tolerant understanding method in accordance with the present invention.

The distribution of votes for each word in the lexicon is calculated once from the Annotated Training Corpus (202) and stored for use in understanding new utterances. FIG. 5, numeral 500, to start (501) calculating the most likely meaning of a previously unseen input utterance, each word in the speech recognizer (503) is looked up in the lexicon (504) to find its indications for or against each of the possible meanings. When there are no words remaining in the speech recognizer output (502), the votes cast for and against each meaning are summed up across the words of the utterance (505). The meaning which receives the greatest number of positive votes is selected as the most likely meaning of the utterance (506, 507) and is returned (508) as the final output (509).

Table 1 shows a portion of the lexicon which constitutes the Trained Meaning Discriminator (205; 401) of the present invention, generated by the Meaning Discriminator Trainer (203) embodied as a Statistical Lexicon Generator (303), using an Annotated Training Corpus (202). This portion of the lexicon is consulted to determine the meaning of the previously unseen input utterance "How long have I been driving," for which a speech recognizer has produced the output string "how long it I'm driving." Table 1 and Table 2 have 15 columns for the possible meanings.

TABLE 1

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| how | 9 | 9 | 0 | 5 | 6 | 4 | 3 | 9 | −6 | −7 | −7 | −6 | −6 | −8 | −7 |
| long | 2 | 31 | 0 | 1 | −4 | 15 | −2 | −2 | −5 | −6 | −5 | −6 | −5 | −6 | −5 |
| it | 22 | 9 | −3 | 3 | −1 | 0 | 1 | 12 | −6 | −6 | −5 | −7 | −7 | −3 | −6 |
| I'm | −6 | −4 | −4 | −2 | −5 | −5 | −3 | −4 | 17 | 0 | 28 | −5 | 1 | 1 | −6 |
| driving | 36 | 4 | −3 | −1 | 5 | 0 | −4 | −6 | 2 | −5 | −3 | −7 | −6 | −7 | −3 |

Table 2 shows the discrimination array created by the Trained Meaning Discriminator (205). In this example, meaning 1 receives the greatest number of votes, and is therefore selected by the meaning interpreter as the most likely meaning of the utterance.

TABLE 2

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Total | 63 | 49 | −10 | 6 | 1 | 14 | −5 | 9 | 2 | −23 | 8 | −31 | −23 | −23 | −27 |

The method thus provides not only an indication of the most likely meaning of an input utterance, but also a means for measuring confidence in the result obtained. The absolute number of votes is received by the highest ranking meaning is a measure of how likely it is that some valid meaning is associated with the utterance. In cases where no such meaning is arrived at, such as with out-of-domain utterances, the positive and negative votes tend to cancel each other out, resulting in a low score. The ratio of the number of votes received by the highest ranking meaning to the number received by the second-highest ranking is a measure of how likely it is that a unique best meaning has been found. When there is a near-tie between the two (or more) highest ranking meanings, a low-confidence signal can be generated. For example, a workable value for a near-tie may be a difference of 10 percent between two highest ranking meanings. However, whether or not there is a meaning that is clearly valid and unique, the meaning extractor of the present invention will always return an answer, namely the highest ranking meaning. It is up to the User (101) of the Spoken Language Dialogue System (109) to decide what use to make of the reported low-confidence signal.

Such a device may be enhanced in several ways. First, the number of votes allotted to any given word may be adjusted up or down. It is known that certain words have purely syntactic functions, and should not contribute to the determination of meaning, even if the distribution of the certain words in the Annotated Training Corpus (202) would seem to make them indicators for particular meanings. Other words may be observed to have strong content for a particular domain, and so should be given more votes than normal in that domain. Such adjustments may be done by hand, using linguistic and domain knowledge about which words are semantically empty function words, and which words carry special significance in the domain at hand. Alternatively, the adjustments may be performed automatically; for example, by experimenting with making each word in the lexicon in turn a function word, and seeing which of those changes lead to improvements in the overall performance of the system.

Second, words may be treated not in isolation, but in pairs or groups. Some words occur in idioms, which may be treated as multi-word lexical items. Treating idioms as a unit may lead to a more accurate picture of the distribution of the constituent words. As with adjusting the number of votes received by each word, treating idioms as a unit may also be effected by hand, incorporating linguist and domain knowledge of idioms. Treating idioms as a unit may also be performed automatically, by generating a compound from each successive pair of words co-occurring in the training corpus.

In FIGS. 1 and 2, numerals 100 and 200, a second embodiment for implementing a Noise-Tolerant Language Understander (104; 204) utilizes a Neural Network (603) based classifier. Because the corpus is annotated such that the intended meanings for each utterance are included, a Neural Network (603) can be trained to learn the associations between utterances and their intended meanings.

Figure 6:
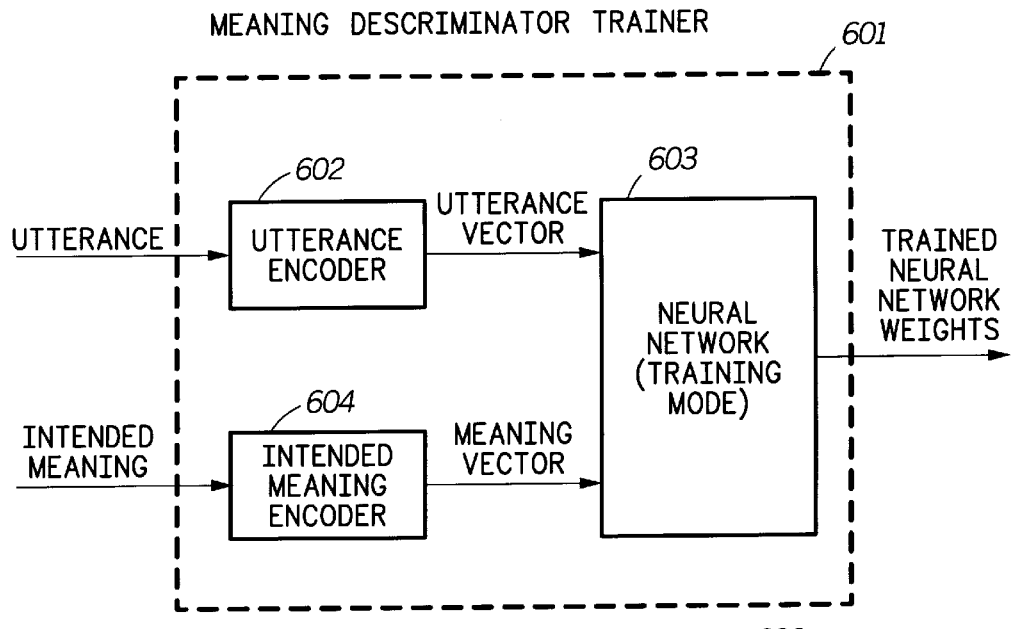
FIG. 6 is a schematic representation of another embodiment of a meaning discriminator trainer in accordance with the present invention.

The Neural Network (603) classifier consists of two separate subsystems: a meaning discriminator training system and a trained meaning discriminator system. FIG. 6, numeral 600, shows a diagram of a Neural Network (603) based meaning discriminator trainer in accordance with the present invention. FIG. 6, numeral 600, the Meaning Discriminator Trainer (601) contains two data preprocessing systems (602; 604) to supply training data for the Neural Network (603). The Utterance Encoder (602) receives a recognized utterance, e.g., from a speech recognizer or speech database, and encodes the utterance into a binary vector (an utterance vector) based upon the vocabulary of the training corpus to be used as input to the Neural Network (603). In a preferred embodiment, the Neural Network (603) is a multi-layer perceptron, as is known in the art. Each element of the encoded vector corresponds to a word in the vocabulary of the Annotated Training Corpus (202). A value of "1" indicates that the corresponding vocabulary word is in the utterance. A value of "0" indicates that the corresponding vocabulary word is not in the utterance.

The other component of the training system is the Intended Meaning Encoder (604). The Intended Meaning Encoder (604) maps the meaning intended by the speaker of a single utterance to a meaning vector. In a preferred embodiment, the element of the meaning vector corresponding to the intended meaning is set to a value of "0.9". Other elements of the meaning vector are set to a value of "0.1".

Using the utterance vector and the meaning vector obtained from the Utterance Encoder (602) and the Intended Meaning Encoder (604) based on an Annotated Training Corpus (202), the Neural Network (603) is trained.

The Neural Network (603) produces an output hypothesis vector based on its input vector and the internal transfer functions used by the processing elements. The coefficients used in the transfer functions are varied during the training process to vary the output layer result vector. The coefficients of the transfer functions are collectively referred to as the weights of the Neural Network (603). The weights are adjusted in the training process to vary the output layer result vector produced by given input vectors as described below. The weights are set to small random values initially in the range of "−0.01" to "0.0". In FIG. 6, the utterance vector from the Utterance Encoder (602), is applied to the inputs of the Neural Network (603). The Neural Network (603) inputs are processed according to the Neural Network (603) weight values to produce an output layer result vector. At the beginning of the training session, the Neural Network's (603) output layer result vector is not significant since the Neural Network (603) weights are random values. An error signal vector is generated in proportion to the distance between the Neural Network's (603) output layer result vector and the meaning vector from the Intended Meaning Encoder (604).

The error signal is calculated to be the raw distance between the Neural Network's (603) output layer result vector and the meaning vector from the Intended Meaning Encoder (604), for example by using a Euclidean distance measure, shown in .

Equation $$E = \sum_k ((d_k - o_k)^2)$$

After computation of the error signal, the weight values are then adjusted in an appropriate direction to reduce the error signal. This process is repeated a number of times for the associated pairs of input vectors and output layer result vectors. This process of adjusting the weights to bring the Neural Network's (603) output layer result vector closer to the meaning vector from the Intended Meaning Encoder (604), is the training of the Neural Network (603). This training uses the standard method of back propagation of errors, as is known in the art. Once the Neural Network (603) is trained, the weight values possess the information necessary to convert an utterance vector from the Utterance Encoder (602) to an output layer result vector similar in value to the meaning vector from the Intended Meaning Encoder (604). The preferred Neural Network (603) implementation requires up to ten million presentations of the utterance vector to its inputs and the following weight adjustments before the Neural Network (603) is considered fully trained.

The Neural Network (603) typically uses sigmoid transfer functions, as are known in the art. The Neural Network (603) has three layers. There are a number of inputs to the Neural Network (603) equal to the number of distinct words which may occur in utterances of a domain. For example, in a domain which may be described using a vocabulary of 596 words, there are 596 inputs to the Neural Network (603). If a given word is present in an utterance, an input associated with the word is set to a value of "1". An input associated with a word not in the utterance is set to a value of "0".

Figure 4:
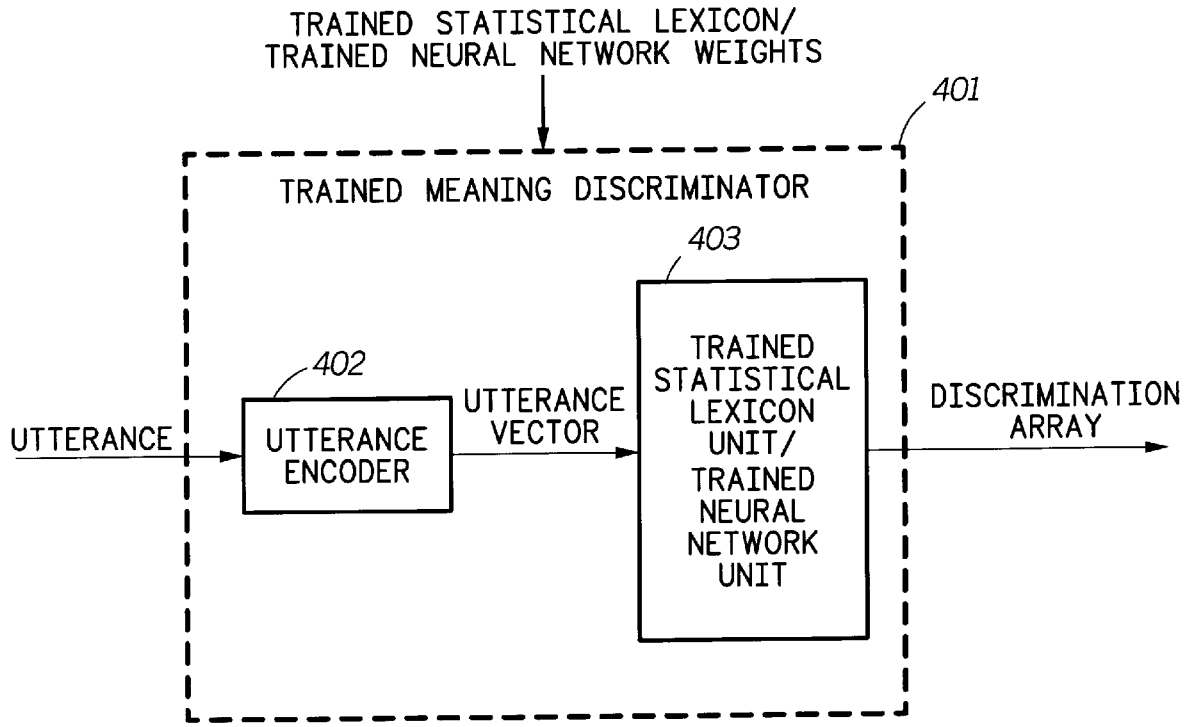
FIG. 4 is a schematic representation of a trained meaning discriminator in accordance with the present invention.

The Trained Meaning Discriminator (401) is shown in FIG. 4, numeral 400. It consists of two components: the Utterance Encoder (402), and the Trained Neural Network (403). The Utterance Encoder (402) is identical to the encoder used in the training system. The Trained Neural Network (403) takes an utterance vector and produces a discrimination array.

Figure 7:
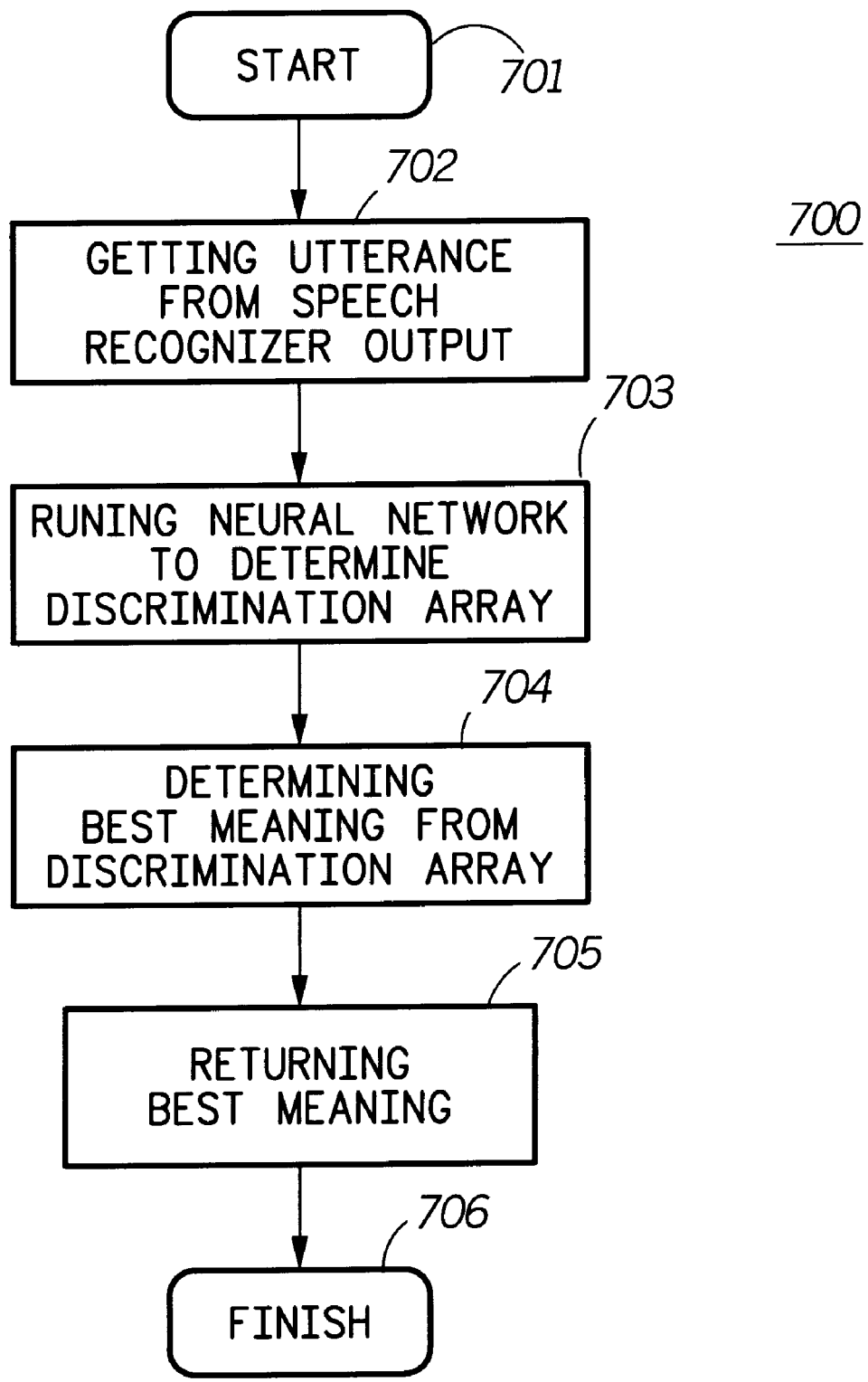
FIG. 7 is a flow chart representation of one embodiment of steps of a neural network based noise tolerant understanding method in accordance with the present invention.

As shown in FIG. 7, numeral 700, to calculate the most likely meaning of a previously unseen input utterance, at the start (701) the utterance is transferred from the speech recognizer (702) to the neural network. The utterance is converted to a discrimination array by running the neural network (703). The meaning with the highest activation level in the discrimination array is selected as the most likely meaning of the utterance (704) and is returned (705) as the final output (706).

FIG. 2, numeral 200, the Meaning Extractor (206) receives the output of the Trained Meaning Discriminator (205) to determine which of the meanings was intended by the utterance. In this case, the Meaning Extractor (206) selects the meaning that corresponds to the Trained Meaning Discriminator (205) output with the highest activation.

FIG. 1, numeral 100, The Noise-Tolerant Language Understander (104; 204) receives a single utterance from output of the Speech Recognizer (103) and generates a meaning.

By training the Meaning Discriminator Trainer (203) with output from a Speech Recognizer (103), the Meaning Discriminator Trainer (203) learns the sentence/meaning associations despite errors made during recognition. The Noise-Tolerant Language Understander (104; 204) compensates for the types of errors the Speech Recognizer (103) makes which improves the performance of the Spoken Language Dialog System (109).

Figure 8:
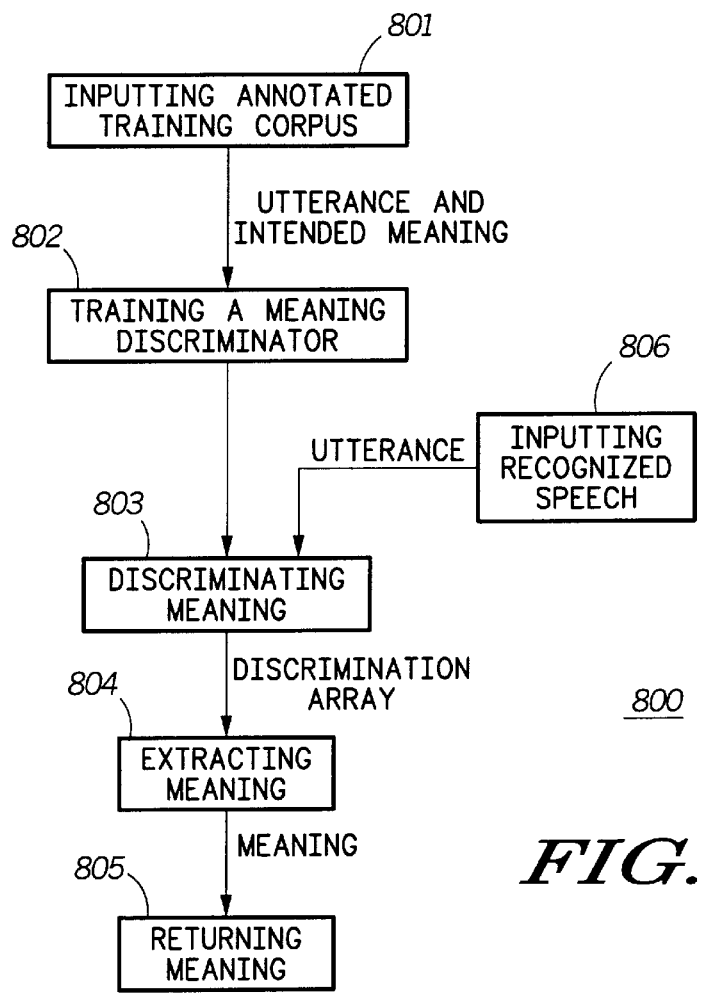
FIG. 8 is a flow chart representation of one embodiment of steps of building and utilizing a noise tolerant language understanding method in accordance with the present invention.

FIG. 8, numeral 800, is a flow chart representation of one embodiment of steps of building and utilizing a noise tolerant language understanding method in accordance with the present invention. The steps include: inputting an annotated training corpus (801); training a meaning discriminator (802) and inputting recognized speech (806) to the trained meaning discriminator; discriminating the meaning (803) to provide a discrimination array; extracting a meaning (804) from the discrimination array; and returning the meaning (805) that was extracted.

Figure 9:
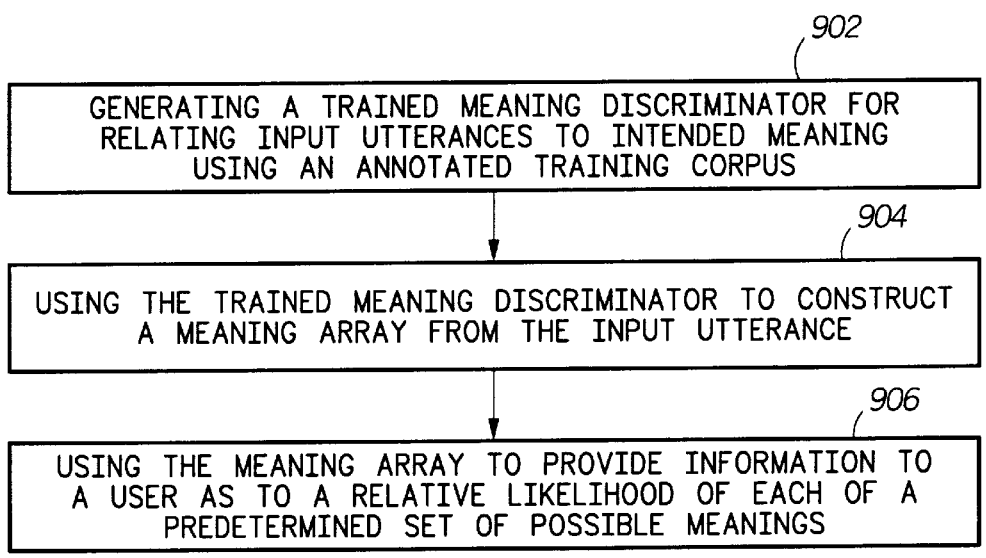
FIG. 9 illustrates one embodiment of steps in accordance with the method of the present invention.

As shown in FIG. 9, numeral 900, the method of the present invention includes: A) generating (902) a trained meaning discriminator for relating input utterances to intended meaning using an annotated training corpus; B) using (904) the trained meaning discriminator to construct a meaning array from the input utterance; and C) using (906) the meaning array to provide information to a user as to a relative likelihood of each of a predetermined set of possible meanings.

The steps of the method may be stored in a memory unit of a computer or alternatively, embodied in a tangible medium of a Digital Signal Processor, DSP, an Application Specific Integrated Circuit, ASIC, or a gate array. The invention may be implemented in an electrical communication unit such as a telephone, a computer, a personal digital assistant, a cellular phone, a mobile radio, a car navigation system, a pager, or the like.

The present invention may be embodied in other specific forms without departing from its spirit or essential characteristics. For example, the meaning discriminator may be implemented using a genetic algorithm or a decision tree. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for determining a meaning from an input utterance, comprising the steps of:
   A) generating a trained meaning discriminator for correlating an input utterance to intended meaning using an annotated training corpus;
   B) using the trained meaning discriminator to construct a meaning array from the input utterance; and
   C) using the meaning array to provide information to a user as to a relative likelihood of each of a predetermined set of meanings.

2. The method of claim 1 wherein the input utterance is represented as text in the form of one of:
   D) a string of words;
   E) a word lattice; and
   F) a combination of D and E.

3. The method of claim 1 where the input utterance is provided by an output of a speech recognizer in the form of:
   D) a string of words;
   E) a word lattice; and
   F) a combination of D and E.

4. The method of claim 1 where the annotated training corpus contains data for each input utterance comprising:
   a textual representation of the input utterance; and
   at least one intended meaning of the input utterance.

5. The method of claim 4 wherein the annotated training corpus contains input utterances obtained from language in written form.

6. The method of claim 4 wherein the annotated training corpus contains utterances obtained from an output of a speech recognizer.

7. The method of claim 4 wherein the annotated training corpus contains at least one of a predetermined set of possible meanings associated with each utterance.

8. The method of claim 1 wherein generating the trained meaning discriminator comprises the steps of:
    calculating a degree of correlation between a word of each utterance of the annotated training corpus and each of a plurality of possible meanings of the predetermined set of possible meanings; and
    using the degree of correlation for each word of each utterance to construct a lexicon of words of the annotated training corpus, wherein each word of the lexicon is associated with indicators of a relative likelihood of each of the plurality of meanings of the predetermined set of possible meanings.

9. The method of claim 8 wherein calculating the degree of correlation between words of the annotated training corpus and possible meanings of the predetermined set of possible meanings is effected with a concordance scheme.

10. The method of claim 8 wherein calculating the degree of correlation between words of the annotated training corpus and the possible meanings is done with a statistical scheme.

11. The method of claim 8 wherein the meaning array is constructed utilizing the steps of:
    obtaining for each word in the input utterance, indicators of the relative likelihood of each of the meanings of the predetermined set of possible meanings from the lexicon of words constructed from the annotated training corpus;
    calculating indicators of the relative likelihood of each of the meanings of the predetermined set of possible meanings for the input utterance as an accumulation of the indicators of each word of the input utterance; and
    analyzing the indicators of the relative likelihood of each of the meanings of the predetermined set of possible meanings for the input utterance using a meaning extractor.

12. The method of claim 1 wherein the meaning array is constructed utilizing the steps of:
    extracting words from the input utterance to generate a vector of words;
    processing the vector of words using a meaning discriminator; and
    analyzing an output of the meaning discriminator using a meaning extractor.

13. The method of claim 12 wherein a primary component of the meaning discriminator is a neural network.

14. The method of claim 12 wherein a primary component of the meaning discriminator is a genetic algorithm unit.

15. The method of claim 12 wherein a primary component of the meaning discriminator is a decision tree unit.

16. The method of claim 12 wherein one of:
    D) software implementing the method is embedded in a microprocessor;
    E) software implementing the method is embedded in a digital signal processor;
    F) the method is implemented by an application specific integrated circuit; and
    G) the method is implemented by a combination of at least two of D–F.

17. The method of claim 1 further providing information to the user as to one of:
    one best meaning according at least to a prespecified criterion; and
    an ordered list of possible meanings.

18. The method of claim 1 further providing information to the user as to one of:
    a uniqueness measure of a best meaning of the input utterance; and
    a significance measure of the best meaning of the input utterance.

19. The method of claim 1 further providing information to the user in text form to be processed by a text to speech synthesizer.

20. The method of claim 1 further providing information to the user in text form to be processed by a dialogue manager.

21. The method of claim 1 wherein the trained meaning discriminator is trained using a method comprising the steps of:
    extracting a set of words from the input utterance;
    obtaining a meaning from the annotated training corpus; and
    updating the trained meaning discriminator based on the set of words from the input utterance and the meaning from the annotated corpus.

22. The method of claim 21 where the set of words obtained by extracting are transformed into a vector whose length is equal to a number of vocabulary words in the annotated training corpus and whose elements have a value of 1 if a corresponding vocabulary word is in a sentence.

23. A device for determining a meaning from an input utterance, comprising:
    A) a training subsystem for using an annotated training corpus to generate a trained meaning discriminator for correlating an input utterance to intended meanings to provide a trained statistical lexicon/trained neural network weights; and
    B) a noise tolerant language understander, having a trained meaning discriminator arranged to receive the trained statistical lexicon/trained neural network weights, for using the trained statistical lexicon/trained neural network weights to construct a discrimination array and having a meaning extractor arranged to receive the discrimination array and output a meaning based on the discrimination array.

24. The device of claim 23 wherein the input utterance is represented as text in the form of one of:
    C) a string of words;
    D) a word lattice; and
    E) a combination of C and D.

25. The device of claim 24 where the annotated training corpus contains data for each input utterance comprising:
    a textual representation of the input utterance; and
    at least one intended meaning of the input utterance.

26. The device of claim 25 wherein the annotated training corpus contains input utterances obtained from language in written form.

27. The device of claim 25 wherein the annotated training corpus contains utterances obtained from an output of a speech recognizer.

28. The device of claim 25 wherein the annotated training corpus contains at least one of a predetermined set of possible meanings associated with each utterance.

29. The device of claim 23 where the input utterance is provided by an output of a speech recognizer in the form of:
    C) a string of words;

D) a word lattice; and

E) a combination of C and D.

30. The device of claim 23 wherein the trained meaning discriminator is generated by calculating a degree of correlation between each word of each utterance of the annotated training corpus and each of a plurality of possible meanings of the predetermined set of possible meanings; and using a degree of correlation to construct a lexicon of the words of the annotated training corpus, wherein each word of the lexicon is associated with indicators of the relative likelihood of each of the plurality of meanings of the predetermined set of possible meanings.

31. The device of claim 30 wherein a concordance scheme is utilized to calculate the degree of correlation between words of the annotated training corpus and meanings of the predetermined set of possible meanings.

32. The device of claim 30 wherein a statistical scheme is utilized to calculate the degree of correlation between words of the annotated training corpus and the meanings of the predetermined set of possible meanings.

33. The device of claim 30 wherein construction of the meaning array includes:
   obtaining for each word in the input utterance, the word's indicators of the relative likelihood of each of the possible meanings of the predetermined set of possible meanings from the lexicon of words constructed from the annotated training corpus;
   calculating indicators of the relative likelihood of each of the meanings of the predetermined set of possible meanings for the input utterance as an accumulation of the indicators of each word of the input utterance; and
   analyzing the indicators of the relative likelihood of each of the meanings of the predetermined set of possible meanings for the input utterance using a meaning extractor.

34. The device of claim 23 wherein construction of the meaning array includes:
   extracting words from the input utterance to generate a vector of words;
   processing the vector of words using a meaning discriminator; and
   analyzing an output of the meaning discriminator using a meaning extractor.

35. The device of claim 34 where a primary component of the meaning discriminator is a neural network.

36. The device of claim 34 where a primary component of the meaning discriminator is a genetic algorithm unit.

37. The device of claim 34 where a primary component of the meaning discriminator is a decision tree unit.

38. The device of claim 23 wherein one of:
   C) device is implemented by software embedded in a microprocessor;
   D) the device is implemented by software embedded in a digital signal processor;
   E) the device is implemented by an application specific integrated circuit; and
   F) the device is implemented by a combination of at least two of C–E.

39. The device of claim 23 wherein the relative likelihood generator further provides information to the user as to at least one of:
   one best meaning according at least to a prespecified criterion; and
   an ordered list of possible meanings.

40. The device of claim 23 wherein the relative likelihood generator further provides information to the user as to at least one of:

a uniqueness measure of a best meaning of the input utterance; and a significance measure of the best meaning of the input utterance.

41. The device of claim 23 wherein the relative likelihood generator further provides information to the user in text form to be processed by a text to speech synthesizer.

42. The device of claim 23 wherein the relative likelihood generator further provides information to the user in text form to be processed by a dialogue manager.

43. The device of claim 23 wherein the trained meaning discriminator is trained using by extracting a set of words from the input utterance, obtaining a meaning from the annotated training corpus, and updating the trained meaning discriminator based on the set of words from the input utterance and the meaning from the annotated training corpus.

44. The device of claim 23 where the set of words obtained by extracting are transformed into a vector whose length is equal to a number of vocabulary words in the annotated training corpus and whose elements have a value of I if a corresponding vocabulary word is in a sentence.

45. A system having a device for determining a meaning from an input utterance, comprising:
   A) a training subsystem for using an annotated training corpus to generate a trained meaning discriminator for correlating an input utterance to intended meanings to provide a trained statistical lexicon/trained neural network weights; and
   B) a noise tolerant language understander, having a trained meaning discriminator arranged to receive the trained statistical lexicon/trained neural network weights, for using the trained statistical lexicon/trained neural network weights to construct a discrimination array and having a meaning extractor arranged to receive the discrimination array and output a meaning based on the discrimination array.

46. A device for determining a meaning from an input utterance, comprising:
   A) a training subsystem for using an annotated training corpus to generate a trained meaning discriminator for correlating an input utterance to intended meanings to provide a trained statistical lexicon/trained neural network weights; and
   B) a noise tolerant language understander, having a trained meaning discriminator arranged to receive the trained statistical lexicon/trained neural network weights, for using the trained statistical lexicon/trained neural network weights to construct a discrimination array and having a meaning extractor arranged to receive the discrimination array and output a meaning based on the discrimination array.

47. A system for determining a meaning from an input utterance, comprising:
   A) a meaning discriminator generator for using an annotated training corpus to generate a trained meaning discriminator for correlating an input utterance to intended meanings;
   B) a meaning array constructor, coupled to the trained meaning discriminator, for using the trained meaning discriminator to construct a meaning array from the input utterance; and
   C) a relative likelihood generator, coupled to the meaning array constructor, for using the meaning array to provide information to a user as to a relative likelihood of each of a predetermined set of possible meanings.

48. A electrical communication unit for determining a meaning from an input utterance, comprising:
  A) a training subsystem for using an annotated training corpus to generate a trained meaning discriminator for correlating an input utterance to intended meanings to provide a trained statistical lexicon/trained neural network weights; and
  B) a noise tolerant language understander, having a trained meaning discriminator arranged to receive the trained statistical lexicon/trained neural network weights, for using the trained statistical lexicon/trained neural network weights to construct a discrimination array and having a meaning extractor arranged to receive the discrimination array and output a meaning based on the discrimination array.

49. The electrical communication unit of claim 48 wherein the electrical communication unit is one of: a telephone, a computer, a personal digital assistant, a cellular phone, a mobile radio, a car navigation system, and a pager.

* * * * *